United States Patent
Voss

(10) Patent No.: US 11,269,967 B1
(45) Date of Patent: Mar. 8, 2022

(54) AUTOMATED SURFACING OF HISTORICAL SOCIAL MEDIA ITEMS

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 348 days.

(21) Appl. No.: 16/353,542

(22) Filed: Mar. 14, 2019

(51) Int. Cl.
- G06F 16/9536 (2019.01)
- G06F 16/906 (2019.01)
- G06F 16/9537 (2019.01)
- G06Q 50/00 (2012.01)

(52) U.S. Cl.
CPC ........ G06F 16/9536 (2019.01); G06F 16/906 (2019.01); G06F 16/9537 (2019.01); G06Q 50/01 (2013.01)

(58) Field of Classification Search
CPC ............... G06F 16/9536; G06F 16/906; G06F 16/9537; G06Q 50/01
See application file for complete search history.

(56) References Cited

U.S. PATENT DOCUMENTS

| | | | | |
|---|---|---|---|---|
| 8,447,801 | B1 * | 5/2013 | Roche | H04L 67/306 709/201 |
| 9,563,784 | B2 * | 2/2017 | Meredith | G06F 21/62 |
| 10,019,136 | B1 * | 7/2018 | Ozog | H04N 21/466 |
| 2003/0158855 | A1 * | 8/2003 | Farnham | G06F 3/0481 |
| 2005/0289110 | A1 * | 12/2005 | Giampaolo | G06F 16/168 |
| 2006/0161635 | A1 * | 7/2006 | Lamkin | G06F 16/4387 709/217 |
| 2006/0248573 | A1 * | 11/2006 | Pannu | G06F 21/62 726/1 |
| 2008/0134298 | A1 * | 6/2008 | Nathan | G06F 8/20 726/4 |
| 2009/0144183 | A1 * | 6/2009 | Gatchell | G06Q 10/06 705/34 |
| 2013/0132477 | A1 * | 5/2013 | Bosworth | H04L 63/107 709/204 |
| 2015/0127643 | A1 * | 5/2015 | Cohen | G06F 16/447 707/725 |

(Continued)

OTHER PUBLICATIONS

Tsai, Janice Y., et al. "Who's viewed you? The impact of feedback in a mobile location-sharing application." Proceedings of the SIGCHI Conference on Human Factors in Computing Systems. 2009. (Year: 2009).*

(Continued)

*Primary Examiner* — Mohsen Almani
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting past interactions. The program and method include generating a group profile for a plurality of users that includes a plurality of media items previously exchanged between the plurality of users and saved by at least one of the plurality of users; computing a prior time period as a function of a current date and a specified time interval; searching the plurality of media items to identify a collection of media items that were exchanged between the plurality of users during the prior time period; and generating for display in a graphical user interface a subset of the identified collection of media items.

20 Claims, 10 Drawing Sheets

(56) References Cited

U.S. PATENT DOCUMENTS

| | | | | |
|---|---|---|---|---|
| 2015/0339464 | A1* | 11/2015 | Kode | G06F 21/31 |
| | | | | 726/18 |
| 2016/0105526 | A1* | 4/2016 | Kritt | H04L 67/06 |
| | | | | 709/204 |
| 2016/0234267 | A1* | 8/2016 | Hebbar | H04N 21/8586 |
| 2016/0323262 | A1* | 11/2016 | Tan | H04L 63/0846 |
| 2016/0344720 | A1* | 11/2016 | Nayak | H04L 51/32 |
| 2017/0093780 | A1* | 3/2017 | Lieb | G06T 3/40 |
| 2018/0052840 | A1* | 2/2018 | Scott | G06F 16/44 |
| 2018/0081927 | A1* | 3/2018 | Soryal | H04L 67/1097 |
| 2019/0158366 | A1* | 5/2019 | Higgins | G06Q 10/06313 |

OTHER PUBLICATIONS

Bayer, Joseph B., et al. "Sharing the small moments: ephemeral social interaction on Snapchat." Information, Communication & Society 19.7 (2016): 956-977. (Year: 2016).*

Hu, Hongxin, Gail-Joon Ahn, and Jan Jorgensen. "Multiparty access control for online social networks: model and mechanisms." IEEE Transactions on Knowledge and Data Engineering 25.7 (2012): 1614-1627. (Year: 2012).*

\* cited by examiner

AUTOMATED SURFACING OF HISTORICAL SOCIAL MEDIA ITEMS

TECHNICAL FIELD

The present disclosure relates generally to group profiles in messaging applications.

BACKGROUND

Users are always seeking new ways to connect with their friends on social media platforms. One way users try to connect with their friends is by discussing their past interactions. Finding such past interactions to engage in such a discussion involves manually searching through many messages the user exchanged with their friends. Such messages are typically scattered and disorganized, requiring a great deal of time and effort to find a message of interest.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
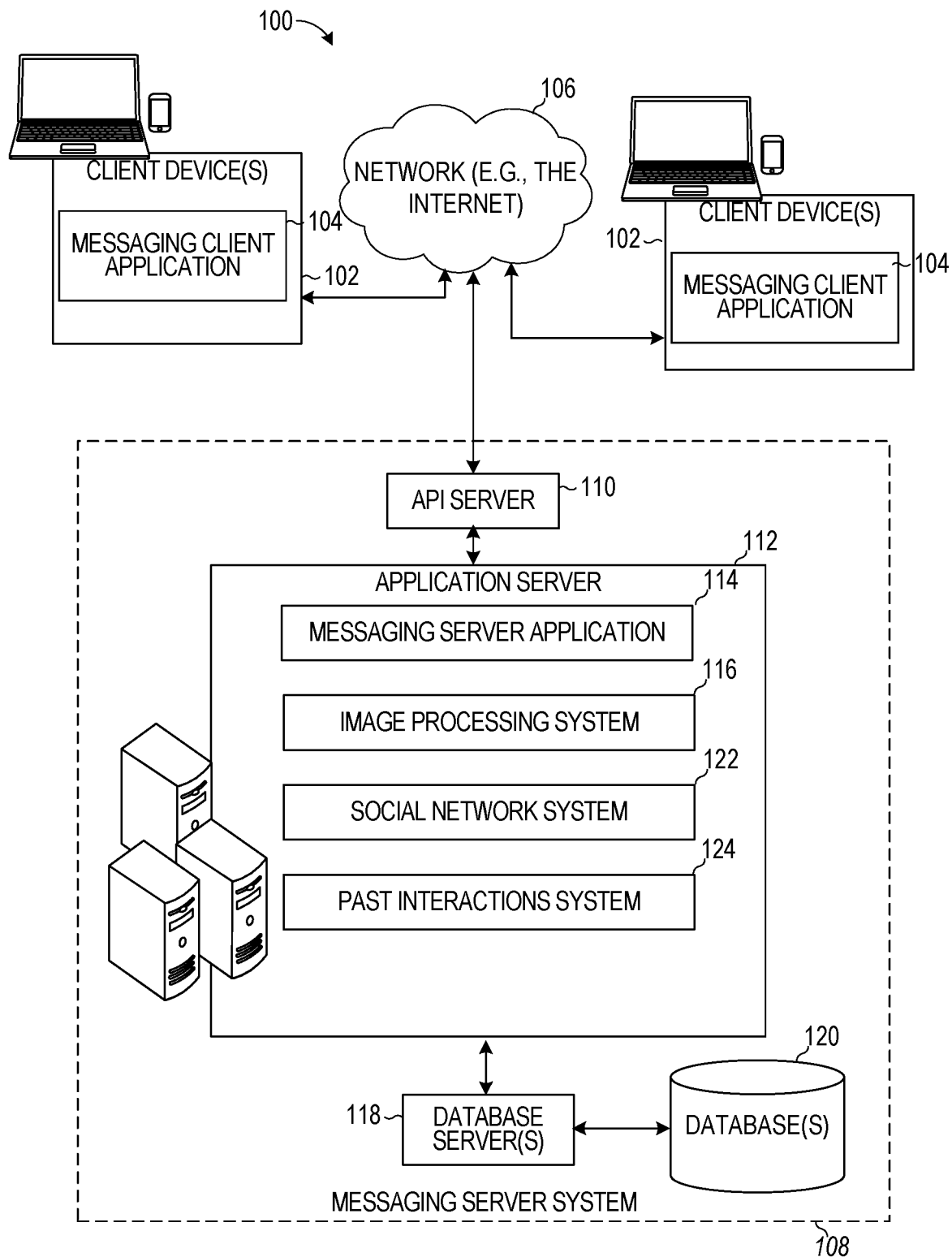
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical social media network platforms allow users to connect with one another through a chat screen. A given user is presented with a list of their friends and the user can pick and choose which of the friends the given user wants to communicate with. These social media network platforms typically save entire conversations the users have, including every single message, image, and video that the users exchange. In certain cases, content is discarded if the content is over a certain age.

Sometimes users would like to revisit their prior conversations to engage in new interactions with their friends or reminisce on prior engagements. However, because all the messages and interactions are saved, finding the prior conversation the user is looking for requires a great deal of effort and time. This is because to find a message in a prior conversation of interest, a given user has to manually search through hundreds of previous messages and, even then, the user may miss the message of interest. Thus, users typically do not undertake the effort needed to find the prior message of interest and miss out on precious opportunities to connect with their friends. This also makes saving such prior conversations pointless and a waste of storage and computational resources.

Some typical systems have limited the number of messages that are saved by saving only those messages in a conversation the user requests to save. However, such systems fail to meaningfully organize and present the prior saved messages. Thus, even in these systems numerous messages may end up being saved by users, requiring the same daunting effort to find a message of interest.

The disclosed embodiments improve the efficiency of using the electronic device by automatically visually presenting to a user one or more media items saved from previous conversations that may be of interest to the user. Specifically, the disclosed embodiments generate a group profile that includes media items exchanged by a group of users and saved by at least one of the users in the group. The disclosed embodiments select a time interval that may be of interest to the user, such as one year ago. The disclosed embodiments search the previously saved media items to identify a collection of media items that were exchanged on the date that precedes the current date by the selected time interval. The collection of media items is automatically surfaced and presented to the group of users in a graphical user interface that includes the group profile.

In some embodiments, a notification is generated that identifies media items that were exchanged in a prior conversation by the group of users and saved by at least one of the users during a specified time interval, such as media items exchanged in the last year. The notification is presented to the group of users in a conversation interface of the messaging application. In some implementations, the notification is only generated and displayed in the conversation interface if the group of users frequently and recently exchanged messages. Namely, a communication frequency metric is determined for the group of users that is based on a frequency of messages exchanged between the users (e.g., how frequently messages are exchanged) and recency of messages exchanged by the users (e.g., how recently the users have communicated). If the communication frequency metric corresponds to a frequency threshold, such as more than five messages per hour and within the past week, then the notification is presented to the group of users. If the communication frequency metric fails to correspond to the frequency threshold, then the notification is prevented from being presented to the group of users.

By automatically presenting to a user the previously exchanged media items and/or notifications about such media items that are likely to be of interest to the user, the system provides the user with an easy and efficient way to connect with their friends and reminisce on past events. Namely, with minimal user input, the user is informed about which media items are of likely interest to the user. In this way, rather than paging through multiple screens of information and manually searching through hundreds of previously exchanged messages to find a media item of interest, the user is presented with meaningful previously exchanged media items quickly and simply through an interactive visual indicator of such media items in a graphical user interface.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

The messaging client application 104 allows a group of two or more users to create a group profile. The group profile includes stored information that is common to the group. Such information includes images, videos, attachments, and messages the group of users exchanged with each other during one or more prior conversations. As referred to herein, a prior conversation is a previous interaction (e.g., an interaction that took place more than one day before the present time, such as one year ago) between two or more users that includes messages, text, images, graphics, avatars, animations, attachments, videos, and so forth. Each of the prior conversations may include all of the previous interactions that took place in a single day, such that all of the prior conversations represent a collection of conversations across multiple days. A conversation segment is any combination of the interaction between the two or more users that does not include all of the content of the conversation. For example, a conversation takes place during the course of one day and includes hundreds of messages exchanged by the two or more users during the course of the day. A conversation segment of the conversation may include a snippet of the conversation, such as only four or five out of the hundreds of messages that were exchanged during only several minutes of the entire day.

In some embodiments, content is added to the group profile only in response to a specific request from one of the users in the group. For example, if the users in the group exchange hundreds of messages, all of those messages, by default, will be automatically deleted and removed from storage after a specified time period (e.g., one hour, one minute, one second, etc.). If, prior to the specified time period when the messages are automatically deleted, any one of the users in the group selects one or more messages for permanent retention, the selected messages are added to the group profile. Such messages can be viewed by any one of the users in the group at any given time. Similarly, other content the users exchange in the messaging client application 104 with each other is automatically discarded after a given time period but can be added to the group profile by any one of the users to avoid deletion.

For example, input from a first user of the two or more users is received to save one or more messages exchanged with the group of users, and in response to the input, the one or more messages are added to the group profile. To add the messages to the group profile, a determination is made as to whether a conversation segment for the given date of the messages already exists for the group profile. Specifically, the messaging client application 104 determines whether a given one of a plurality of conversation segments that were previously stored corresponds to a same day on which the one or more messages that the first user selects to store were exchanged. In response to determining that the given one of the plurality of conversation segments corresponds to the same day as the one or more messages the first user selects to store, the messaging client application 104 adds the one or more messages to the given one of the plurality of conversation segments. In response to determining that the given one of the plurality of conversation segments corresponds to a different day from the same day on which the one or more messages were exchanged, the messaging client application 104 generates a new conversation segment that includes the one or more messages the first user selects to store.

In some embodiments, media items, such as videos and images, are added to the group profile only in response to a specific request from one of the users in the group. For example, if the users in the group exchange hundreds of messages in which some of the messages include media items, such media items, by default, will be automatically deleted and removed from storage after a specified time period (e.g., one hour, one minute, one second, etc.). If, prior to the specified time period when the media items are automatically deleted, any one of the users in the group selects one or more media items for permanent retention, the selected media items are added to the group profile. Such media items can be viewed by any one of the users in the group at any given time.

In some embodiments, media items that are stored are associated with the date on which the media items were exchanged by the users. The group profile may present, daily, monthly, or weekly, a collection of media items that are associated with a date that precedes a current date by a specified time interval. For example, the group profile may include a dedicated portion in which media items that were exchanged exactly one year ago from the current date are retrieved and displayed. In some implementations, the dedicated portion may present media items that were exchanged during a range of dates (e.g., all dates from the previous year). In such cases, any media item that was previously exchanged and saved to the group profile that is associated with a date corresponding to the previous year (e.g., 2018) relative to the current year (e.g., 2019) is presented in the dedicated portion.

In some embodiments, the messaging client application 104 communicates with a past interactions system 124 to identify a collection of previously exchanged and saved media items to present in the group profile on a given day, week, or month. In an implementation, the messaging client application 104 computes a prior date as a function of a current date and a specified time interval by, for example, determining a difference between the current date and the specified time interval. For example, if the specified time interval is one year, the messaging client application 104 computes the prior date to be the same current date one year prior (e.g., if the current date is Apr. 1, 2019, the prior date is computed to be Apr. 1, 2018). The messaging client application 104 searches the plurality of media items that were previously exchanged by the group of users and saved by at least one of the users to identify a collection of media items that were exchanged between the plurality of users on the prior date. After a given collection of previously exchanged and saved media items is identified, the messaging client application 104 presents interactive visual indicators (e.g., an icon) that represent each media item in the collection. Specifically, the messaging client application 104 generates for display in a graphical user interface a subset of the identified collection of media items.

In some implementations, the order of the identified collection of media items that are displayed and/or which media items are included in the collection is based on a score that is computed for and assigned to each media item in the collection. In such circumstances, the media items included in the graphical user interface may be associated with a score that exceeds a specified value.

In some embodiments, if the graphical user interface is opened the next day (e.g., on Apr. 2, 2019), the messaging client application 104 communicates with the past interactions system 124 to identify another collection of media items that were exchanged on the prior date (e.g., on Apr. 2, 2018) and updates the display to represent the other collection of media items. Namely, the messaging client application 104 replaces the previously generated for display collection of media items that were exchanged and saved one year and one day prior to the current day with the collection of media items that were exchanged and saved one year prior to the current day. The specified time interval may be one year, one month, one week, several years, or any other user-specified or automatically selected time interval.

In some implementations, a user in the group of users can update a setting of the group profile to change the specified time interval that is used to search for the collection of previously exchanged and saved media items. In such circumstances, the media items that are presented to one user in the group as part of the collection of media items that were exchanged and saved on the prior date that is a function of the specified time interval and the current date are also presented to another user in the group. In this way, one user in the group of users can control the time interval used to search for previously exchanged media items that other users in the group are presented when they access the group profile.

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding and deleting of friends to and from a social graph; the location of friends within a social graph; access to user conversation data; access to avatar information stored on the messaging server system 108; and the opening of an application event (e.g., relating to the messaging client application 104).

The application server 112 hosts a number of applications and subsystems, including the messaging server application 114, an image processing system 116, a social network system 122, and the past interactions system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114. A portion of the image processing system 116 may also be implemented by the past interactions system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following," and also the identification of other entities and interests of a particular user. Such other users may be referred to as the user's friends. The social network system 122 may access location information associated with each of the user's friends to determine where they live or are currently located geographically. The social network system 122 may maintain a location profile for each of the user's friends indicating the geographical location where the user's friends live.

The application server 112 is communicatively coupled to the database server 118, which facilitates access to the database 120 in which is stored data associated with messages processed by the messaging server application 114.

Figure 2:
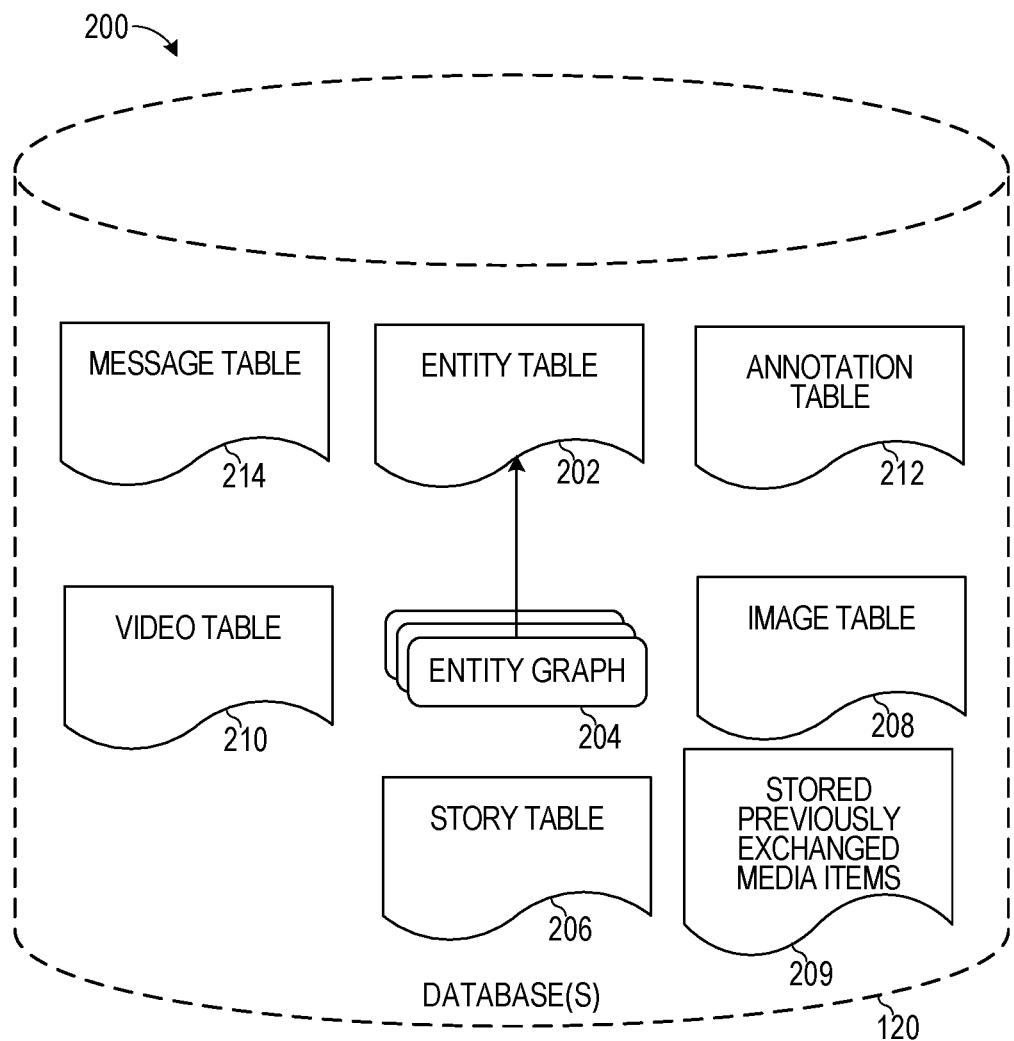
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation-related feature(s).

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Stored previously exchanged media items 209 may store one or more media items for a group of users that the past interactions system 124 uses to identify a collection of media items to include on a given date or day in the messaging client application 104. For example, when a given user in a group of users provides input requesting to save selected media items that were exchanged as part of a conversation with the group of users, a date and time stamp of each of the selected media items is retrieved and stored in the stored previously exchanged media items 209. In some embodiments, a score generated by the past interactions system 124 is also stored in association with the media items in the stored previously exchanged media items 209. In some embodiments, the media items stored in the stored previously exchanged media items 209 are grouped according to dates or days.

The stored previously exchanged media items 209 may store information about the communication frequency metric of a given group of users associated with a group profile. The communication frequency metric indicates how often or frequently the users in the group exchange messages (e.g., one message per minute or five messages per hour). Namely, the communication frequency metric may continuously or periodically be updated based on a rate at which messages are exchanged by the users in the group. The communication frequency metric also stores how recently the users in the group communicated (e.g., less than one week ago). Specifically, the communication frequency metric may specify a difference between a time stamp of the last message that was exchanged in the conversation between the group of users and the current time. This difference indicates how recently the users in the group communicated.

A story table 206 stores data regarding collections of messages and associated image, video, or audio data, which are compiled into a collection (e.g., a story or a gallery). The creation of a particular collection may be initiated by a particular user (e.g., any user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
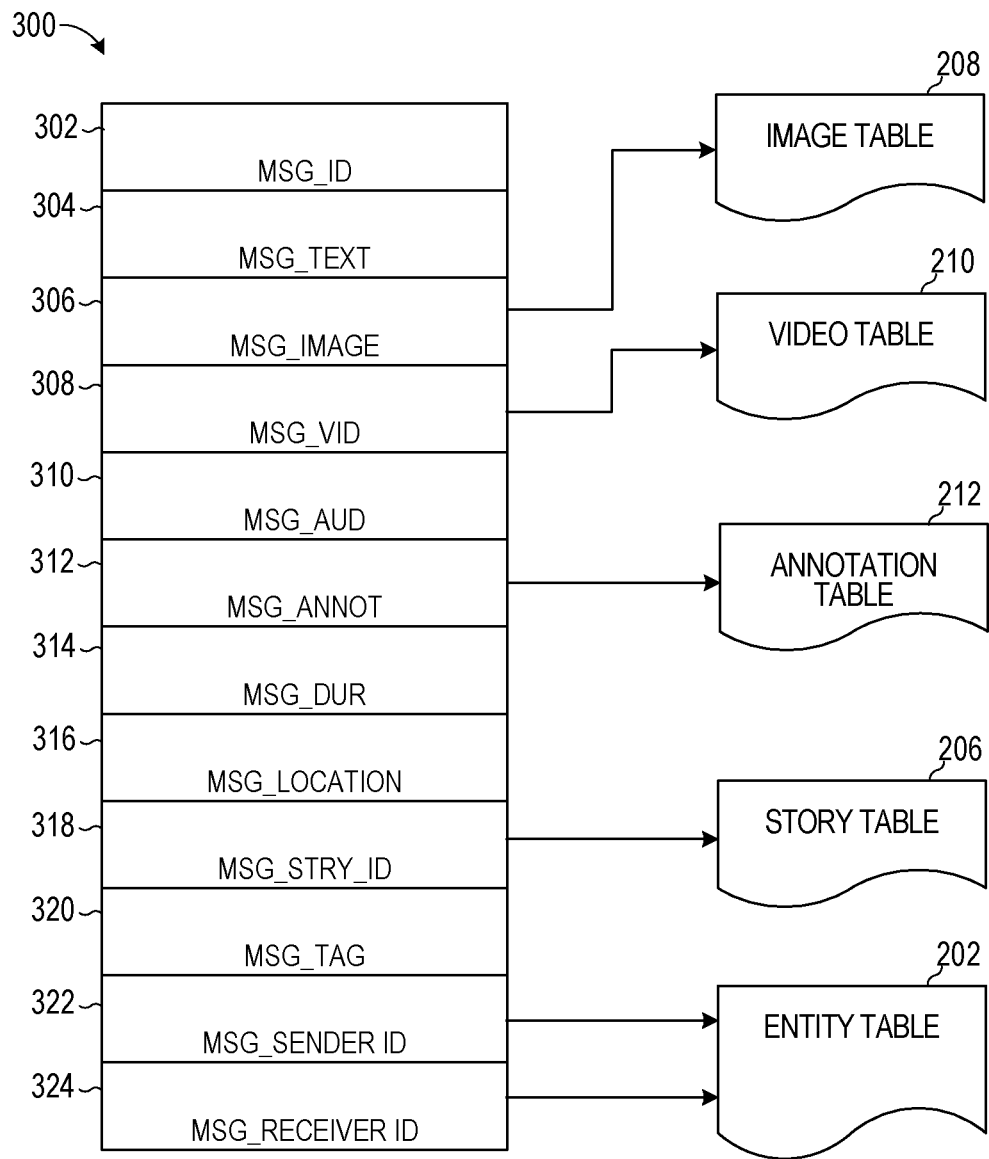
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to the message image payload 306, message video payload 308, or message audio payload 310 of the message 300.
- A message duration parameter 314: a parameter value indicating, in seconds, the amount of time for which content of the message 300 (e.g., the message image payload 306, message video payload 308, or message audio payload 310) is to be presented or made accessible to a user via the messaging client application 104.
- A message geolocation parameter 316: geolocation data (e.g., latitudinal and longitudinal coordinates) associated with the content payload of the message 300. Multiple message geolocation parameter 316 values may be included in the payload, with each of these parameter values being associated with content items included in the content (e.g., a specific image within the message image payload 306, or a specific video in the message video payload 308).
- A message story identifier 318: an identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of one or more users of the client device(s) 102 to which the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within the image table 208. Similarly, values within the message video payload 308 may point to data stored within the video table 210, values stored within the message annotations 312 may point to data stored in the annotation table 212, values stored within the message story identifier 318 may point to data stored in the story table 206, and values stored within the message sender identifier 322 and the message receiver identifier 324 may point to user records stored within the entity table 202.

Figure 4:
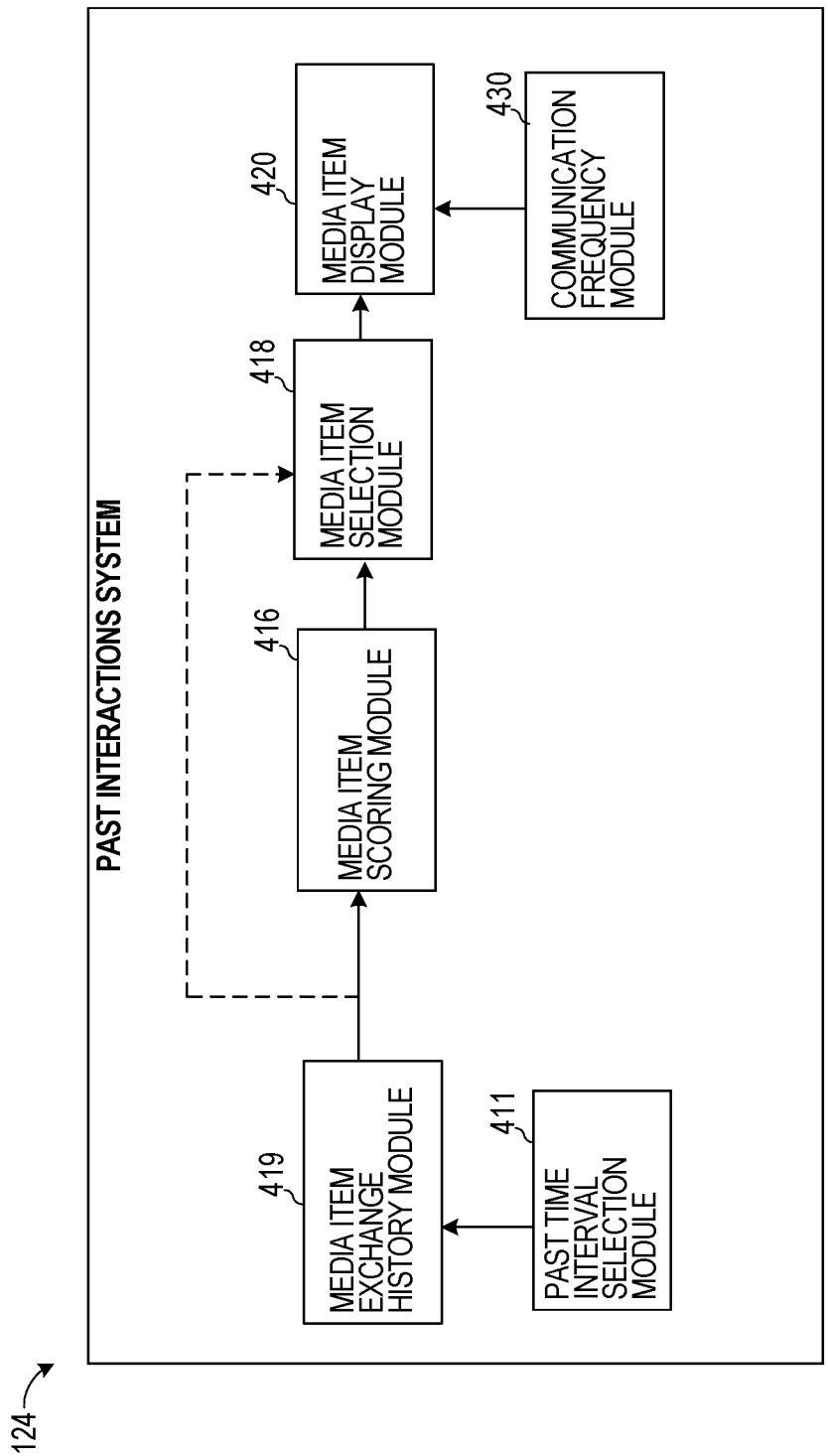
FIG. 4 is a block diagram showing an example past interactions system, according to example embodiments.

FIG. 4 is a block diagram showing an example past interactions system 124, according to example embodiments. The past interactions system 124 includes a media item exchange history module 419, a past time interval selection module 411, a media item scoring module 416, a media item selection module 418, a media item display module 420, and a communication frequency module 430. The media item exchange history module 419 accesses the stored previously exchanged media items 209 to retrieve a plurality of previously exchanged and stored media items for a group profile for a plurality of users. Specifically, the media item exchange history module 419 may retrieve a group profile identifier for a given group profile for the plurality of users. The media item exchange history module 419 searches the stored previously exchanged media items 209, based on the group profile identifier, to retrieve a set of media items that were exchanged between the plurality of users and saved by one or more of the users before the media items were automatically deleted.

The past time interval selection module 411 obtains a specified time interval (e.g., one year) from a group profile associated with the group of users and the group profile identifier. In some implementations, the past time interval selection module 411 presents a graphical user interface with a setup screen to a given user of the group of users. The graphical user interface allows the user to change various settings that will be effective on the group profile and affect the way in which content is presented to the group of users collectively. For example, the user can select the past time interval, such as by navigating a menu of options that lists various time intervals (e.g., one week, one month, one year, multiple years, or a customizable time interval. The customizable time interval allows the user to specify any time interval or range of time intervals.

The past time interval selection module 411 communicates the specified time interval to the media item exchange history module 419. The media item exchange history module 419 obtains the current date and computes a prior date as a function of the current date and the specified time interval. For example, the media item exchange history module 419 computes a difference between the current date and the specified time interval to determine the prior date. Specifically, if the specified time interval is one year and the current date is Apr. 1, 2019, the media item exchange history module 419 computes the prior date to be Apr. 1, 2018 (or one year previous to the current date). The media item exchange history module 419 communicates with the stored previously exchanged media items 209 to retrieve, as a collection of media items, all of the previously stored and exchanged media items that are associated with the prior date that has been computed. In some embodiments, the media item exchange history module 419 automatically retrieves a new collection of media items as the current date changes (e.g., on every new day or new week or new month). Namely, as the current date changes, the media item exchange history module 419 updates the prior date as a function of the new current date and retrieves the new corresponding collection of media items to provide to other modules in the past interactions system 124.

In some embodiments, the media item exchange history module 419 communicates the collection of media items to the media item scoring module 416. In some implementations, the media item exchange history module 419 skips the media item scoring module 416 and provides the collection of media items directly to the media item selection module 418 and/or the media item display module 420.

The media item scoring module 416 analyzes the collection of media items received from the media item exchange history module 419. The media item scoring module 416 assigns scores to the media items based on any number of factors, including relevance to the group of users collectively, a number of likes or dislikes of a given media item in the collection on a social media network, a number of comments associated with a given media item, a number of faces present in each media item, and/or whether the faces present in the media items correspond to or match faces of the users in the group of users.

In some embodiments, the media item scoring module 416 performs image and facial recognition techniques on the media items to detect faces present in the media items. The media item scoring module 416 employs the image processing system 116 (FIG. 1) to perform such facial recognition. Upon detecting faces in each media item, the media item scoring module 416 may count how many faces are in the media item. In some implementations, if a given media item includes more than a threshold number of faces, the media item scoring module 416 may increase the score assigned to the media item. In some implementations, the score assigned to the given media item is proportional to the number of faces that are detected. For example, if three faces are detected, the score assigned to the media item is increased by a factor of three, and if four faces are detected, the score is increased by a factor of four or five.

In some embodiments, the media item scoring module 416 obtains a facial map representing facial landmarks of each user in the group of users. The media item scoring module 416 generates a facial map representing facial landmarks of each face detected in the media items. The media item scoring module 416 compares the facial landmarks of each user in the group of users with the facial landmarks of the faces in the media items to determine whether the faces detected in the media items correspond to the faces of the users in the group. Namely, the media item scoring module 416 determines whether the media items represent the users in the group or if they represent other users. If a given media item is determined to include faces that correspond to the users in the group, the score assigned to the given media item is increased. Otherwise, the score is decreased.

The media item scoring module 416 sorts the collection of media items based on the assigned scores to generate a ranked list of media items that are in the collection of media items. The media items with the highest scores may be positioned first in a list, and the media items with lower scores are positioned later in the list. The ranked list of media items that were exchanged by the users in the group and saved by at least one of the users in the group on the prior date or during the range of prior dates is provided to the media item selection module 418.

The media item selection module 418 selects randomly, pseudo-randomly, or based on an assigned score one or more media items that are in the collection received from the media item exchange history module 419. The selected one or more media items are provided to the media item display module 420.

The media item display module 420 generates a visual indicator for each media item that is received from the media item selection module 418. The visual indicator may be a scaled-down version or representation of the corresponding media item. The media item display module 420 generates for display in a graphical user interface that includes the group profile a plurality of the visual indicators that represent the media items received from the media item selection module 418. For example, the media item display module 420 presents to each of the users in the group of users who are accessing the group profile, in a dedicated portion of a display, a plurality of indicators representing media items the users exchanged on the prior date (e.g., one year ago from the current date).

In some embodiments, the media item display module 420 generates and displays a notification to the plurality of users in the group in a conversation interface. The notification may indicate to the plurality of users that a collection of media items that were exchanged and saved on a range of prior dates (e.g., media exchanged in the prior year) is available. The notification may appear as a message in the conversation interface and be interactively selectable to access and view the collection of media items.

In some implementations, the notification is displayed by the media item display module 420 in the conversation interface only if the communication frequency metric, representing how frequently (or often) and how recently the group of users have exchanged messages, corresponds to a threshold. Particularly, if the group of users do not often exchange messages (e.g., exchange messages once per week) and exchanged their last message more than three days prior to the current time, the media item display module 420 may prevent the notification from being presented to the group of users. If the group of users often exchange messages (e.g., exchange messages once per day) and exchanged their last message less than three days prior to the current time, the media item display module 420 may present the notification to the group of users in the conversation interface.

The media item display module 420 communicates with the communication frequency module 430 to obtain a determination as to whether the communication frequency metric for the group of users corresponds to the frequency threshold. The communication frequency module 430 computes the communication frequency metric for the group of users by analyzing the rate at which the group of users exchange messages (e.g., the frequency of message exchange) and how recently the users exchanged messages. The communication frequency module 430 may generate a value or metric representing the rate and the recency by combining weighted values of the frequency and recency. Namely, a first weight may be applied to the frequency measure that is computed by dividing the total number of messages that are exchanged by the users over a specified time interval by the length of the time interval. A second weight may be applied to the recency that is computed based on a difference between a time stamp of the last message that was exchanged and current time.

The weighted values of the frequency and recency are combined by the communication frequency module 430 by computing a sum. The sum is compared to a frequency threshold which may be predetermined or selected by one of the users in the group. If the sum exceeds the frequency threshold, the communication frequency module 430 indicates to the media item display module 420 that the communication frequency metric for the group of users corresponds to the frequency threshold. If the sum fails to exceed the frequency threshold, the communication frequency module 430 indicates to the media item display module 420 that the communication frequency metric for the group of users fails to correspond to the frequency threshold.

Figure 5:
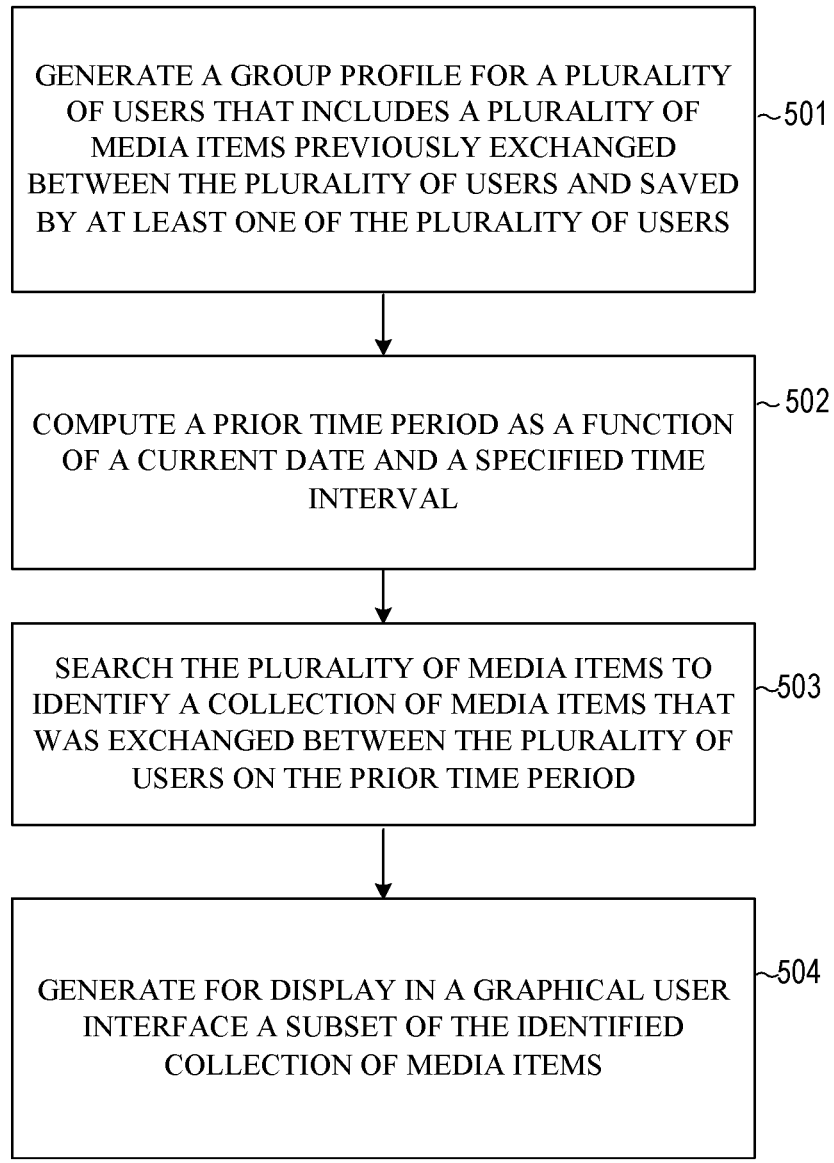
FIGS. 5 and 6 are flowcharts illustrating example operations of the past interactions system, according to example embodiments.

FIG. 5 is a flowchart illustrating example operations of the past interactions system 124 in performing a process 500, according to example embodiments. The process 500 may be embodied in computer-readable instructions for execution by one or more processors such that the operations of the process 500 may be performed in part or in whole by the functional components of the messaging server system 108 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of the process 500 can be in parallel, out of order, or entirely omitted.

At operation 501, the past interactions system 124 generates a group profile for a plurality of users that includes a plurality of media items previously exchanged between the plurality of users and saved by at least one of the plurality of users. For example, the media item exchange history module 419 accesses the stored previously exchanged media items 209 to retrieve a group profile that includes previously stored media items for a plurality of users associated with the group profile.

At operation 502, the past interactions system 124 computes a prior time period (e.g., specified date or range of dates) as a function of a current date and a specified time interval. For example, the media item exchange history module 419 computes a difference between a current date and a time interval provided by the past time interval selection module 411.

At operation 503, the past interactions system 124 searches the plurality of media items to identify a collection of media items that were exchanged between the plurality of users during the prior time period. For example, the media item exchange history module 419 searches the stored previously exchanged media items 209 for the previously exchanged and saved media items that are associated with the prior date.

At operation 504, the past interactions system 124 generates for display in a graphical user interface a subset of the identified collection of media items. For example, the media item display module 420 generates a graphical user interface that displays one or more indicators that represent each media item in the subset of the identified collection of media items.

Figure 6:
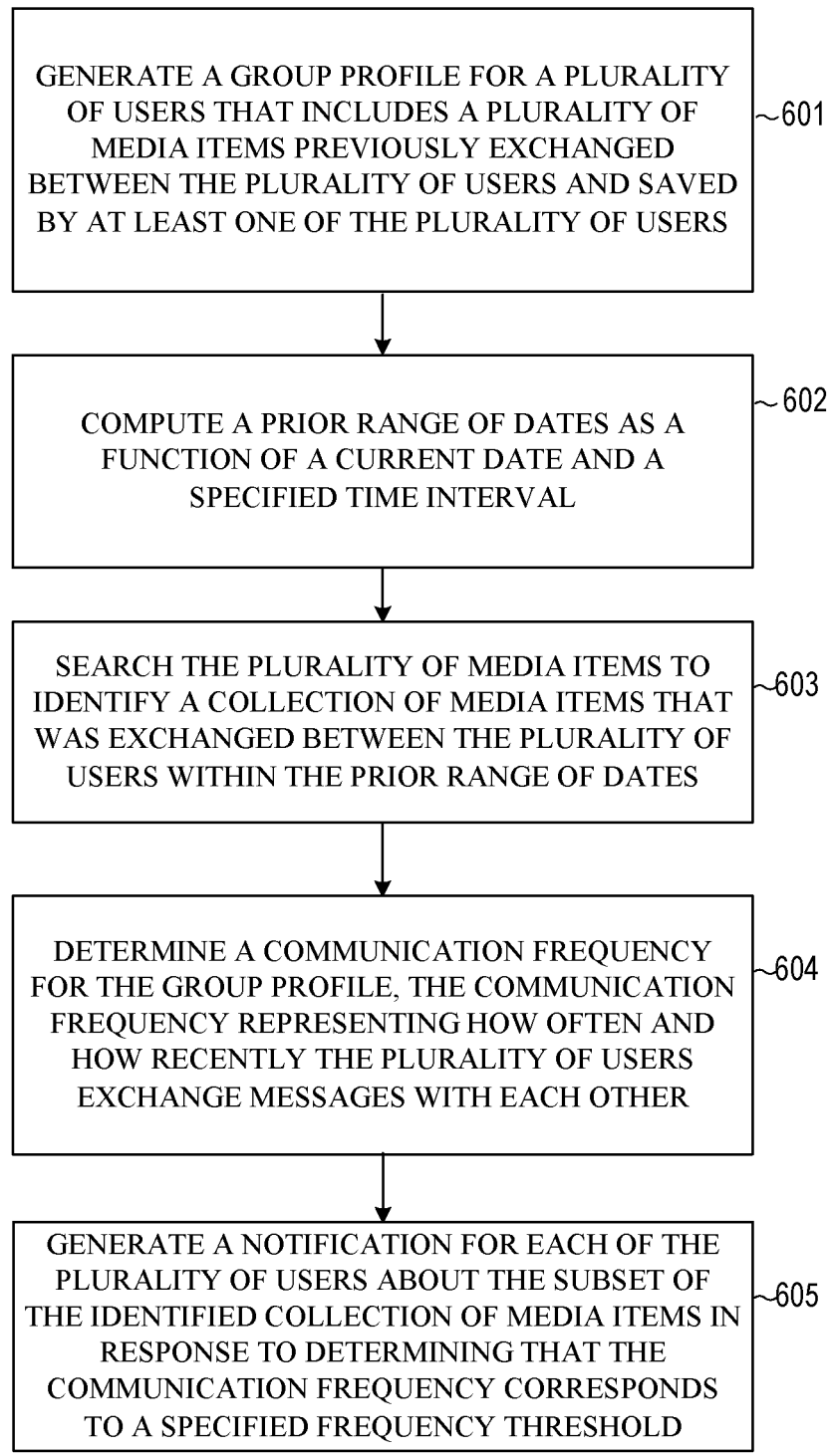

FIG. 6 is a flowchart illustrating example operations of the past interactions system 124 in performing a process 600, according to example embodiments. The process 600 may be embodied in computer-readable instructions for execution by one or more processors such that the operations of the process 600 may be performed in part or in whole by the functional components of the messaging server system 108 and/or messaging client application 104; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of the process 600 can be in parallel, out of order, or entirely omitted.

At operation 601, the past interactions system 124 generates a group profile for a plurality of users that includes a plurality of media items previously exchanged between the plurality of users and saved by at least one of the plurality of users. For example, the media item exchange history module 419 accesses the stored previously exchanged media items 209 to retrieve a group profile that includes previously stored media items for a plurality of users associated with the group profile.

At operation 602, the past interactions system 124 computes a prior range of dates as a function of a current date and a specified time interval. For example, the media item exchange history module 419 computes a difference between a current date and a range of dates provided by the past time interval selection module 411. Specifically, the media item exchange history module 419 computes the prior range of dates to be any date that corresponds to the previous year or previous three years.

At operation 603, the past interactions system 124 searches the plurality of media items to identify a collection of media items that were exchanged between the plurality of users within or during the prior range of dates. For example, the media item exchange history module 419 searches the stored previously exchanged media items 209 for the previously exchanged and saved media items that are associated with the prior range of dates.

At operation 604, the past interactions system 124 determines a communication frequency metric for the group profile, the communication frequency metric representing how often and how recently the plurality of users have exchanged messages with each other. For example, the communication frequency module 430 computes a value representing a weighted frequency measure of the rate at which the group of users exchange messages and a weighted recency measure of a difference between a time stamp of the last message that was exchanged and the current time.

At operation 605, the past interactions system 124 generates a notification for each of the plurality of users about a subset of the identified collection of media items in response to determining that the communication frequency metric corresponds to a specified frequency threshold. For example, the media item display module 420 generates a graphical user interface that displays a notification indicating the availability of the collection of media items in a conversation interface viewable by all of the group of users at the same time.

Figure 7:
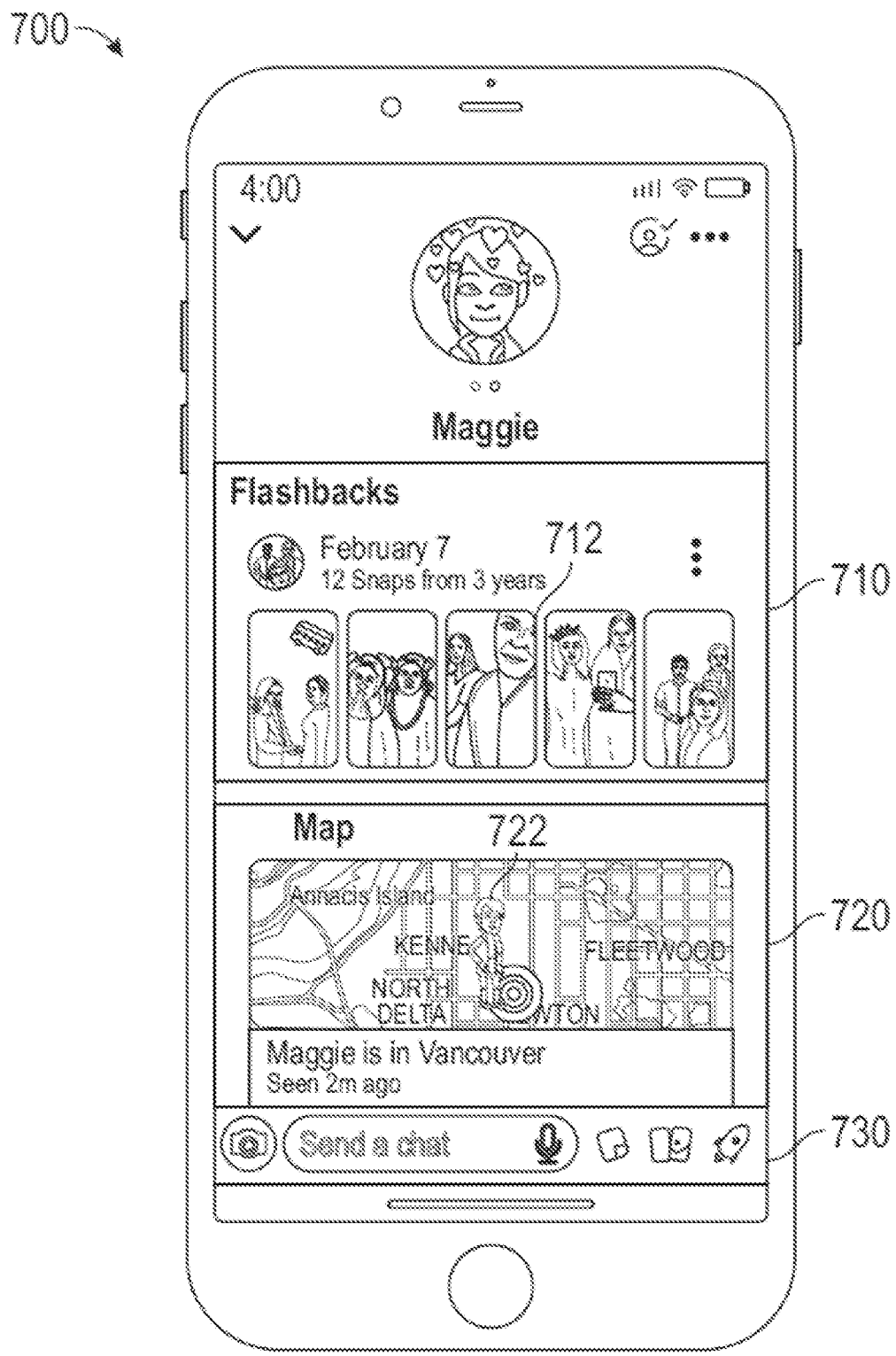
FIGS. 7 and 8 are illustrative inputs and outputs of the past interactions system, according to example embodiments.
Figure 8:

FIGS. 7 and 8 show illustrative inputs and outputs of the past interactions system 124, according to example embodiments. The inputs and outputs shown in FIGS. 7 and 8 can be implemented by the messaging client application 104. A screen 700 shown in FIG. 7 is presented by the messaging client application 104 in response to receiving a user request to access a group profile. In response to that request, the messaging client application 104 obtains and presents common data which a plurality of users in a group previously shared and saved, including messages, media, videos, images, and attachments.

In some embodiments, the screen 700 includes a plurality of portions. A first portion 710 displays a collection of media items that the group of users previously exchanged and saved on a prior date. The collection is provided by the media item exchange history module 419 based on a difference between the current date and a specified time interval. For example, each media item represented by the indicators in the first portion 710 was exchanged by the group of users one year prior to the current date (e.g., the media items were exchanged on Apr. 1, 2018, if the current date is Apr. 1, 2019). Other media items exchanged on adjacent days (e.g., Apr. 2, 2018, and Mar. 31, 2018) are excluded from being represented in the first portion 710.

The first portion 710 may indicate how many total media items are in the collection that is received from the media item exchange history module 419. Namely, if one year ago from the current date, the users exchanged and saved twelve media items, the first portion 710 may specify that twelve media items are in the collection of media items and present indicators for a subset of the media items. If the user taps on the first portion 710, the remaining media items in the collection are displayed in a full-screen display. If the user taps on a given media item indicator 712, that media item is retrieved and displayed in a full-screen display with an option allowing the user to share or send the media item to one or more other users in the group or not in the group. For example, if the given media item indicator 712 corresponds to a video, the video is retrieved and automatically played back in full screen.

The first portion 710 also indicates the time interval that was selected by the past time interval selection module 411. Specifically, the first portion 710 may indicate the prior date (e.g., February 7) that was computed as a function of the current date and the specified time interval.

In some embodiments, the indicators displayed in the first portion 710 are sorted or organized based on their respective scores computed by the media item scoring module 416. For example, a total of twelve media items are included in the collection of media items that were previously exchanged and saved on the prior date, but the first portion 710 displays indicators for only five of those media items that are associated with a highest score among the collection of media items.

A second portion 720 of the screen 700 includes a map-based graphical user interface that displays a map and avatars 722 representing a current geographical location of each user in the group of users. A third portion 730 displays a communication interface to generate a new message to exchange with the plurality of users. For example, the user may type a message in the third portion 730 and select an option to send the message to the plurality of users associated with the group profile.

A screen 800 shown in FIG. 8 is presented by the messaging client application 104. The screen 800 includes a notification 810 that is included in a communication interface and appears as a message to all of the users in the group. The notification 810 indicates the availability of a collection of media items that were exchanged and saved in a prior range of dates. For example, the messaging client application 104 identifies a collection of media items that the users previously exchanged and saved in the previous year (e.g., all the media items that the users exchanged and saved on any day in 2018 if the current year is 2019). The notification 810 can be selected by tapping on the notification 810 to open a full-screen display that lists and shows all the media items in the collection that the users previously exchanged and saved in the previous year. In some implementations, the notification 810 is only presented if the communication frequency metric of the group of users corresponds to a specified frequency threshold.

Figure 9:
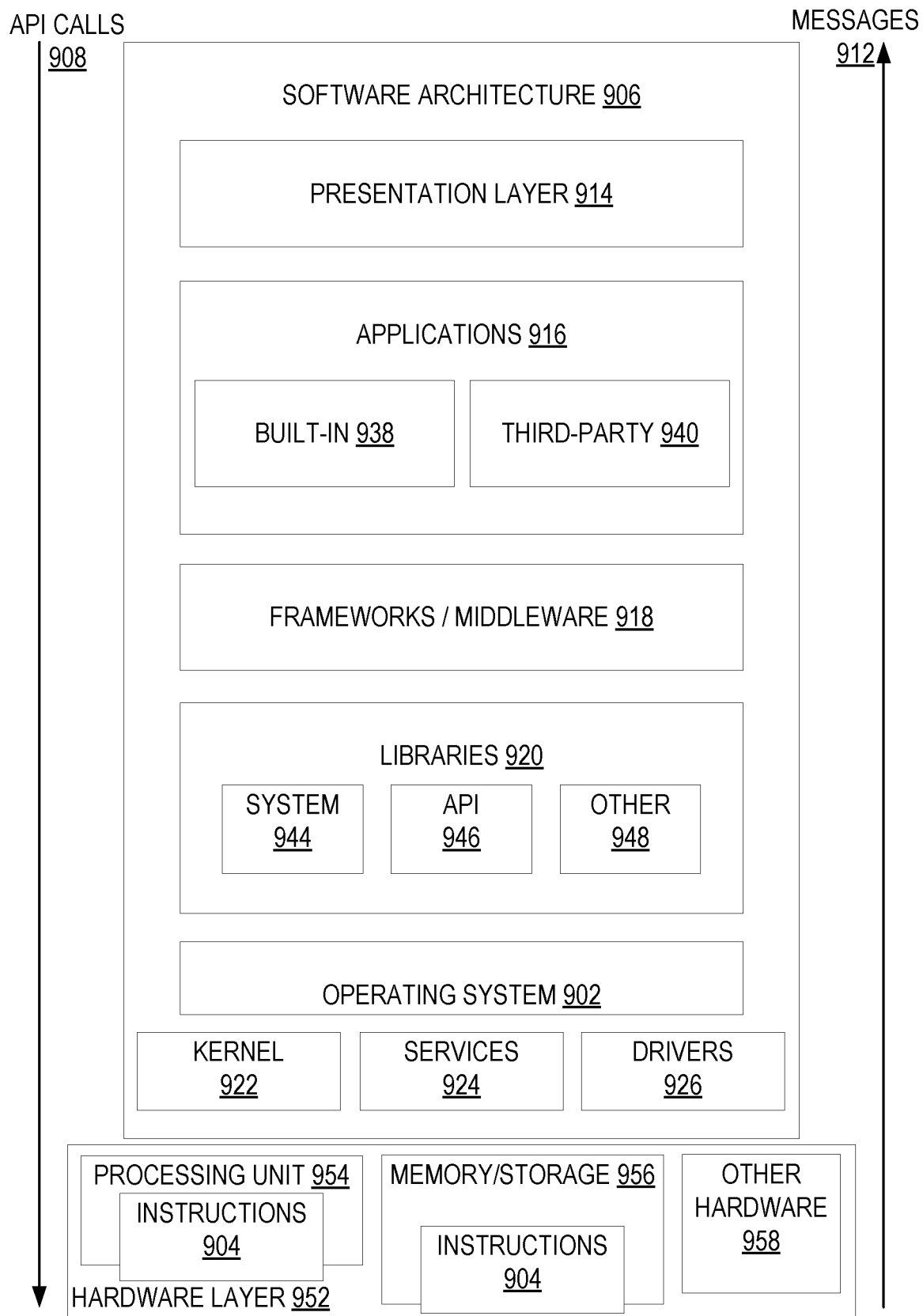
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors 1004, memory 1006 and input/output (I/O) components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules memory/storage 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as the presentation layer 914. In these systems, the application/component "logic" can be separated from the aspects of the application/component that interact with a user.

Figure 10:
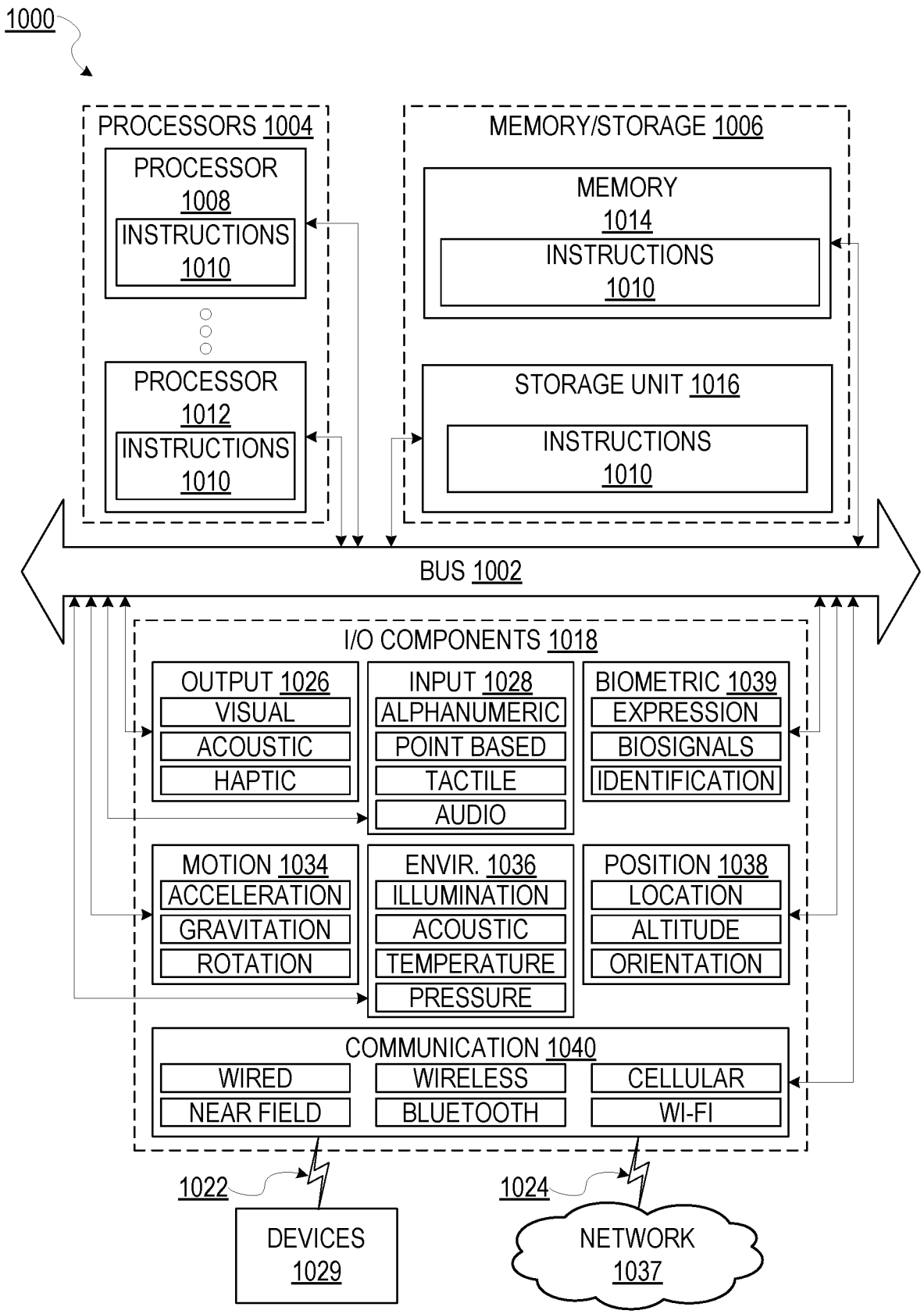
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., by voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via a coupling 1024 and a coupling 1022, respectively. For example, the communication components 1040 may include a network interface component or other suitable device to interface with the network 1037. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible media to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIME STAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   generating, by one or more processors, a group profile for a plurality of users that includes a plurality of media items previously exchanged between the plurality of users and saved by at least one of the plurality of users;
   receiving, from a first client device associated with a first of the plurality of users, a selection of a specified time interval used to search for a collection of media items from the plurality of media items, the specified time interval being stored as a setting of the group profile;
   computing, by the one or more processors, a prior time period as a function of a current date and the specified time interval stored as the setting of the group profile;
   searching, by the one or more processors, the plurality of media items to identify the collection of media items that were exchanged between the plurality of users during the prior time period;
   receiving, from a second client device associated with a second of the plurality of users, a request to access the group profile; and
   in response to receiving the request to access the group profile, generating, for display in a graphical user interface of the second client device, a subset of the identified collection of media items that were exchanged between the plurality of users during the prior time period that was computed based on the selection of the specified time interval received from the first client device.

2. The method of claim 1 further comprising:
   storing a conversation comprising a plurality of messages exchanged between the plurality of users;
   receiving input from the first client device that identifies a given message of the plurality of messages and requests to save the given message; and
   adding the given message to the group profile in response to receiving the input from the first client device.

3. The method of claim 2, wherein adding the given message to the group profile comprises:
   determining a date on which the given message identified by the input was exchanged;
   searching dates associated with a plurality of conversation segments in the group profile to identify a conversation segment associated with the date on which the given message was exchanged;
   in response to identifying the conversation segment, adding the given message to the conversation segment; and
   in response to determining that the date on which the given message was exchanged fails to match the dates associated with the plurality of conversation segments, generating a new conversation segment that includes the given message to associate with the group profile.

4. The method of claim 1, wherein the specified time interval is one year or more, further comprising generating a score for each media item in the identified collection of media items, wherein the subset of the identified collection of media items includes one or more media items with a generated score that exceeds a specified threshold.

5. The method of claim 1, wherein the request received from the second client device to access the group profile is received on a first day, further comprising:
   receiving a second request from the second client device to access the group profile on a next day that follows the first day;

computing a second time period as a function of the next day and the specified time interval;
searching the plurality of media items to identify a second collection of media items that were exchanged between the plurality of users during the second time period; and
automatically updating the graphical user interface presented on the second client device to replace the subset of the identified collection of media items with a display of the second collection of media items.

6. The method of claim 1, wherein the graphical user interface includes a plurality of portions, further comprising:
displaying in a first portion of the plurality of portions the subset of the identified collection of media items, the first portion indicating how many media items are included in the subset and the specified time interval;
receiving input from the second client device indicating a tap on the first portion;
in response to receiving the input indicating the tap of the first portion, displaying a remaining set of media items that are in the identified collection of media items in full-screen; and
displaying in a second portion of the plurality of portions a map that visually depicts a current geographical location of each of the plurality of users.

7. The method of claim 1, wherein generating the group profile comprises:
receiving input from a first user of the plurality of users to save one or more media items exchanged with a second user of the plurality of users; and
in response to receiving the input, adding the one or more media items to the group profile.

8. The method of claim 1, wherein a given media item exchanged between the plurality of users is automatically deleted after a threshold period of time absent receipt of a user request from one of the plurality of users to save the given media item, wherein the given media item is added to the group profile in response to receiving the request from the one of the plurality of users to save the given media item.

9. The method of claim 1, wherein searching the plurality of media items to identify the collection of media items that were exchanged between the plurality of users during the prior time period comprises searching the plurality of media items to identify a given collection of media items that were exchanged between the plurality of users on a particular date or in a particular range of dates.

10. The method of claim 1, wherein generating for display in the graphical user interface the subset of the identified collection of media items comprises generating for display a plurality of visual indicators each associated with a different media item in the subset of the identified collection of media items.

11. The method of claim 10, wherein a first media item in the subset of the identified collection of media items comprises a video, further comprising displaying the video in response to receiving a user input that selects a given visual indicator of the plurality of visual indicators.

12. The method of claim 1 further comprising generating a notification for each of the plurality of users about the subset of the identified collection of media items, wherein the notification is presented in a conversation interface with a message identifying the subset of the identified collection of media items, the message in the notification representing the computed prior time period.

13. The method of claim 12, further comprising:
determining a communication frequency metric for the group profile, the communication frequency metric being based at least in part on a frequency of message exchange between the plurality of users and based at least in part on a recency of messages exchanged by the plurality of users, the frequency of message exchange represents a quantity of messages exchanged between the plurality of users within a specific time interval; and
generating the notification in response to determining that the communication frequency metric corresponds to a specified frequency threshold.

14. The method of claim 13, wherein presentation of the notification is conditional on the communication frequency metric exceeding the specified frequency threshold.

15. The method of claim 12 further comprising generating for display a plurality of visual indicators each associated with a different media item in the subset of the identified collection of media items in response to receiving a user input that taps the notification.

16. The method of claim 1 further comprising:
analyzing a given media item in the identified collection of media items to determine a number of faces present in the given media item; and
assigning a score to the given media item based at least on the number of faces.

17. The method of claim 16 further comprising:
for each face present in the given media item, determining whether or not the face corresponds to a respective user of the plurality of users, wherein the assigned score is based at least in part on a presence of faces corresponding to the plurality of users in the given media item, such that determining that the face corresponds to the respective user of the plurality of users results in a relative increase in the assigned score.

18. The method of claim 1 further comprising:
analyzing comments on a social media network associated with a given media item in the identified collection of media items to determine a popularity of the given media item; and
assigning a score to the given media item proportional to the popularity of the given media item.

19. A system comprising:
a processor configured to perform operations comprising:
generating a group profile for a plurality of users that includes a plurality of media items previously exchanged between the plurality of users and saved by at least one of the plurality of users;
receiving, from a first client device associated with a first of the plurality of users, a selection of a specified time interval used to search for a collection of media items from the plurality of media items, the specified time interval being stored as a setting of the group profile;
computing a prior time period as a function of a current date and the specified time interval stored as the setting of the group profile;
searching the plurality of media items to identify the collection of media items that were exchanged between the plurality of users during the prior time period;
receiving, from a second client device associated with a second of the plurality of users, a request to access the group profile; and
in response to receiving the request to access the group profile, generating, for display in a graphical user interface of the second client device, a subset of the identified collection of media items that were exchanged between the plurality of users during the prior time period that was computed based on the selection of the specified time interval received from the first client device.

20. A non-transitory machine-readable storage medium that includes instructions that, when executed by one or more processors of a machine, cause the machine to perform operations comprising:
- generating a group profile for a plurality of users that includes a plurality of media items previously exchanged between the plurality of users and saved by at least one of the plurality of users;
- receiving, from a first client device associated with a first of the plurality of users, a selection of a specified time interval used to search for a collection of media items from the plurality of media items, the specified time interval being stored as a setting of the group profile;
- computing a prior time period as a function of a current date and the specified time interval stored as the setting of the group profile;
- searching the plurality of media items to identify the collection of media items that were exchanged between the plurality of users during the prior time period;
- receiving, from a second client device associated with a second of the plurality of users, a request to access the group profile; and
- in response to receiving the request to access the group profile, generating, for display in a graphical user interface of the second client device, a subset of the identified collection of media items that were exchanged between the plurality of users during the prior time period that was computed based on the selection of the specified time interval received from the first client device.

* * * * *